(12) United States Patent
Silvennoinen et al.

(10) Patent No.: US 9,691,177 B2
(45) Date of Patent: Jun. 27, 2017

(54) TECHNIQUES FOR AUTOMATIC OCCLUDER SIMPLIFICATION USING PLANAR SECTIONS

(71) Applicant: UMBRA SOFTWARE LTD., Helsinki (FI)

(72) Inventors: Ari Silvennoinen, Helsinki (FI); Hannu Saransaari, Helsinki (FI); Otso Mäkinen, Helsinki (FI)

(73) Assignee: Umbra Software Ltd., Helsinki (FI)

( * ) Notice: Subject to any disclaimer, the term of this patent is extended or adjusted under 35 U.S.C. 154(b) by 213 days.

(21) Appl. No.: 14/568,816

(22) Filed: Dec. 12, 2014

(65) Prior Publication Data

US 2016/0171745 A1 Jun. 16, 2016

(51) Int. Cl.
*G06T 15/40* (2011.01)
*G06T 17/00* (2006.01)

(52) U.S. Cl.
CPC .............. *G06T 17/00* (2013.01); *G06T 15/40* (2013.01)

(58) Field of Classification Search
None
See application file for complete search history.

(56) References Cited

U.S. PATENT DOCUMENTS

2013/0215115 A1 8/2013 Jenkins

OTHER PUBLICATIONS

Xavier Decoret et al, Billboard Clouds for Extreme Model Simplification, Computer Graphics Forum vol. 33, Issue 1, Feb. 2014, pp. 235-245.*
Fakir S. Nooruddin et al, Simplification and Repair of Polygonal Models Using Volumetric Techniques, IEEE Transactions on Visualization and Computer Graphics, vol. 9 No. 2 Apr.-Jun. 2003 pp. 191-205.*
Hansong Zhang, Visibilty Culling Using Hierarchical Occlusion Maps, Siggraph '97 Proceedings of the 24th annual conference on Computer Graphics and Interactive techniques, 1997, pp. 77-88.*
Silvennoinen et al, "Occluder Simplification using Planar Sections", Computer Graphics Forum, vol. 33, Issue 1; pp. 235-245; Feb. 2014. (First published online Dec. 15, 2013).
Airey J. M., Rohlf J. H., Brooks Jr. F. P.: Towards image realism with interactive update rates in complex virtual building environments. In Proceedings of the 1990 symposium on Interactive 3D graphics (New York, NY, USA, 1990), I3D '90, ACM, pp. 41-50.
Bittner J., Wimmer M., Piringer H., Purgathofer W.: Coherent hierarchical culling: Hardware occlusion queries made useful. Computer Graphics Forum 23,3 (Sep. 2004), 615-624. Proceedings EUROGRAPHICS 2004.

(Continued)

*Primary Examiner* — Barry Drennan
*Assistant Examiner* — Diana Hickey
(74) *Attorney, Agent, or Firm* — Patterson + Sheridan, LLP

(57) ABSTRACT

Techniques are disclosed for simplifying an occluder representing 3D graphics data. Graphics data corresponding to one or more 3D objects is voxelized. A plurality of planes is generated to intersect the voxelized graphics data. Intersections between the planes and the voxelized graphics data are evaluated to identify corresponding slice polygons from the intersections. A subset of the planes is selected to maximize a correctness of a simplified occluder. The simplified occluder representing the object is generated from a union of the selected subset of the planes.

17 Claims, 7 Drawing Sheets

A

B

(56) References Cited

OTHER PUBLICATIONS

Coorg S., Teller S.: Real-time occlusion culling for models with large occluders. In Proceedings of the 1997 symposium on Interactive 3D graphics (New York, NY, USA, 1997), I3D '97, ACM, p. 83.
Cohen J., Varshney A., Manocha D., Turk G., Weber H., Agarwal P., Brooks F., Wright W.: Simplification envelopes. In Proceedings of the 23rd annual conference on Computer graphics and interactive techniques (New York, NY, USA, 1996), SIGGRAPH '96, ACM, pp. 119-128.
Dachsbacher C.: Analyzing visibility configurations. IEEE Transactions on Visualization and Computer Graphics 17, 4 (Apr. 2011), 475åA S,A86.
Darnell N.: Automated occluders for GPU culling. Game Developer Magazine (Sep. 2011).
Décoret X., Durand F., Sillion F. X., Dorsey J.: Billboard clouds for extreme model simplification. ACM Trans. Graph. 22, 3 (Jul. 2003), 689-696.
Garland M., Heckbert P. S.: Surface simplification using quadric error metrics. In Proceedings of the 24th annual conference on Computer graphics and interactive techniques (New York, NY, USA, 1997), SIGGRAPH '97, ACM Press/Addison-Wesley Publishing Co., pp. 209-216.
Germs R., Jansen F. W.: Geometric simplification for efficient occlusion culling in urban scenes. In Proc. of WSCG 2001 (2001), pp. 291-298.
Hoppe H.: Progressive meshes. In Proceedings of the 23rd annual conference on Computer graphics and interactive techniques (New York, NY, USA, 1996), SIGGRAPH '96, ACM, pp. 99-108.
Koltun V., Chrysanthou Y., Cohen-Or D.: Virtual occluders: An efficient intermediate PVS representation. In 11th Eurographics Workshop on Rendering (2000), pp. 59-70.
Luebke D., Georges C.: Portals and mirrors: simple, fast evaluation of potentially visible sets. In Proceedings of the 1995 symposium on Interactive 3D graphics (New York, NY, USA, 1995), I3D '95, ACM, pp. 105-ff.
Lindstrom P., Turk G.: Image-driven simplification. ACM Trans. Graph. 19, 3 (Jul. 2000), 204-241.
Nooruddin F. S., Turk G.: Simplification and repair of polygonal models using volumetric techniques. IEEE Transactions on Visualization and Computer Graphics 9, 2 (Apr. 2003), 191-205.
Persson E.: Creating vast game worlds: experiences from Avalanche Studios. In ACM SIGGRAPH 2012 Talks (Los Angeles, CA, USA, 2012), SIGGRAPH '12, ACM.
Rosenfeld A., Pfaltz J. L.: Sequential operations in digital picture processing. J. ACM 13, 4 (Oct. 1966), 471-494.
Rong G., Tan T.-S.: Jump flooding in gpu with applications to voronoi diagram and distance transform. In Proceedings of the 2006 symposium on Interactive 3D graphics and games (New York, NY, USA, 2006), I3D '06, ACM, pp. 109-116.
Wonka P., Schmalstieg D.: Occluder shadows for fast walkthroughs of urban environments. Computer Graphics Forum 18, 3 (1999), 51-60.
Zhang E., Turk G.: Visibility-guided simplification. In Proceedings of the conference on Visualization '02 (Washington, DC, USA, 2002), VIS '02, IEEE Computer Society, pp. 267-274.

\* cited by examiner

TECHNIQUES FOR AUTOMATIC OCCLUDER SIMPLIFICATION USING PLANAR SECTIONS

BACKGROUND

Field

Embodiments presented herein generally relate to computer image rendering and animation. More specifically, embodiments presented herein provide techniques for using planar sections to generate a simplified occluder geometry used for occlusion culling during rendering.

Description of the Related Art

Real-time rendering of computer graphics is a resource intense operation. Performance can be optimized by rendering the least amount of objects necessary to obtain a workable image. This is frequently done by rendering only 3D objects which are visible within a field of view of the scene being rendered.

Occlusion culling is the process of removing 3D objects from a group of geometry being rendered. The occlusion culling process identifies objects in a scene that are not visible from a camera perspective and removes the objects from the rendering process. Rendering tools rely on occlusion culling to determine what objects in a rendering operation can be skipped to enhance performance. Geometry can therefore be culled by determining the visibility of elements within a view frustum.

Generally, occlusion culling methods generate an occluder for each object to be rendered. An occluder is a simplified version of input geometry which preserves a property of the input geometry, namely, that rays intersecting the occluder also intersect the original geometry. However, some rays that do not intersect the occluder may intersect the original geometry. As a result, a simplified occluder is sometimes referred to as a "conservative occluder." To be effective, an occluder should include relatively few triangles with respect to the input geometry. That is, as occluders themselves become more complex, the benefit to the rendering process diminishes.

Occlusion culling is challenging with more complex sets of geometry. Further, current occlusion culling approaches such as error-sensitive simplification and voxel-based simplification are unsuitable for producing simplifications of input geometry, because of constraints to the input geometry. For instance, an error-sensitive simplification can only operate on a mesh surface of the input geometry.

SUMMARY

One embodiment presented herein describes a method for simplifying an occluder representing 3D graphics data. The method generally includes voxelizing the graphics data corresponding to one or more 3D objects. A plurality of planes to intersect the voxelized graphics data is generated. Intersections between the planes and the voxelized graphics data are evaluated to identify corresponding slice polygons from the intersections. A subset of the planes is selected to maximize a correctness of a simplified occluder representing each 3D object. The simplified occluder is generated from a union of the selected subset of the planes.

Another embodiment presented herein describes a non-transitory computer-readable storage medium storing instructions, which, when executed on a processor, perform an operation for simplifying an occluder representing 3D graphics data. The operation itself generally includes voxelizing the graphics data corresponding to one or more 3D objects. A plurality of planes to intersect the voxelized graphics data is generated. Intersections between the planes and the voxelized graphics data are evaluated to identify corresponding slice polygons from the intersections. A subset of the planes is selected to maximize a correctness of a simplified occluder representing each 3D object. The simplified occluder is generated from a union of the selected subset of the planes.

Yet another embodiment presented herein describes a system having a processor and a memory hosting a program, which, when executed on the processor, performs an operation for simplifying an occluder representing 3D graphics data. The operation itself generally includes voxelizing the graphics data corresponding to one or more 3D objects. A plurality of planes to intersect the voxelized graphics data is generated. Intersections between the planes and the voxelized graphics data are evaluated to identify corresponding slice polygons from the intersections. A subset of the planes is selected to maximize a correctness of a simplified occluder representing each 3D object. The simplified occluder is generated from a union of the selected subset of the planes.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
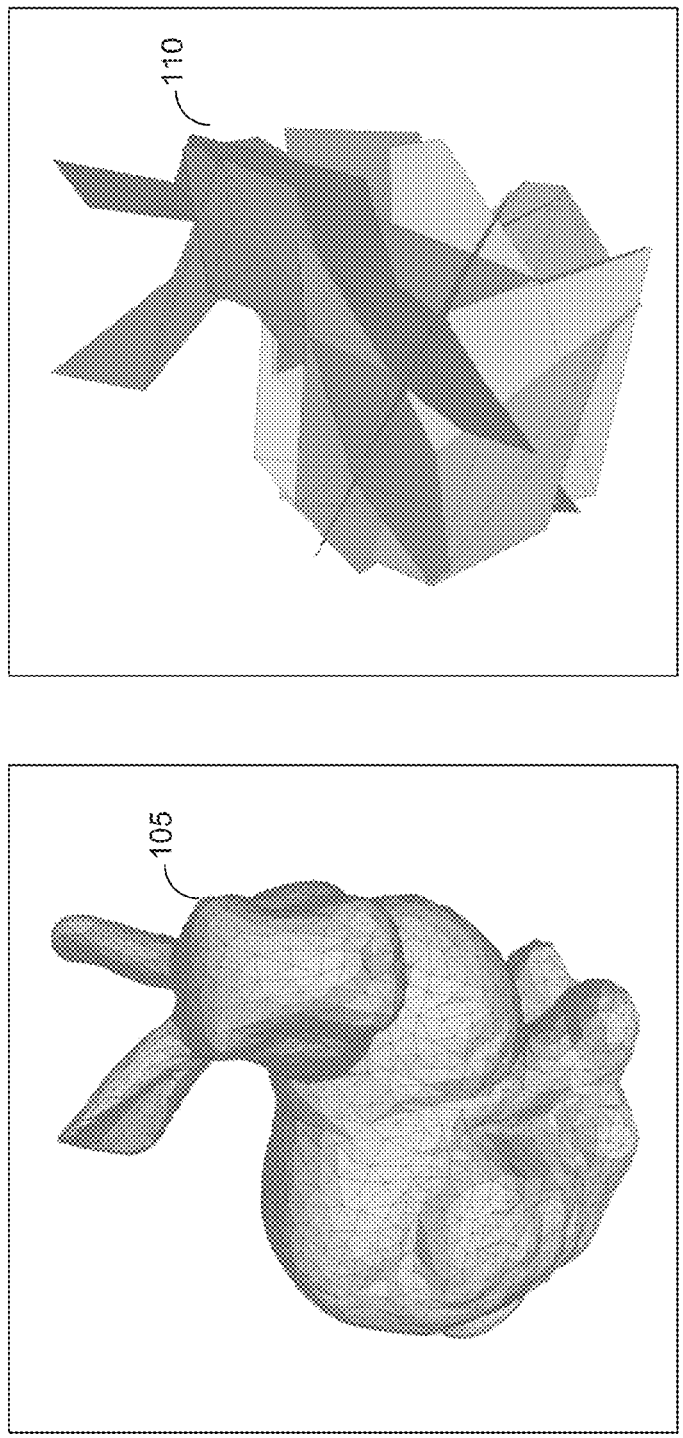
FIG. 1 illustrates an example of a geometric object and an occluder generated to represent the geometric object, according to one embodiment.

Efficient occlusion culling is a challenging issue, particularly for rendering computer graphics scenes in real-time. Visibility algorithms operate on perspective-projected geometry in image space and can capture complex and unpredictable occlusions caused by objects of any scale. The number of potential falsely occluded (or unoccluded) pixels depends on the projected size of a given simplified occluder. Further, an apparent topology of an occluder may vary with distance. For example, assume a box has a small hole in one of the faces. When rendered at a close view, the hole should remain unoccluded in a simplified occluder, but at a distance, the box face can appear solid as the size of the hole shrinks below an error threshold. Therefore, occlusion culling techniques which can account for characteristics (e.g., distance from a camera) and maintain error-boundedness properties are desired.

Embodiments presented herein describe techniques for generating a simplified occluder for complex 3D geometry by using planar sections. In particular, embodiments describe an occluder simplification process based on two considerations. First, every 2D interior slice of a solid object is a conservatively correct occluder. That is, rays occluded by a given slice are a subset of rays occluded by the solid object represented by that object. Second, an error-bounded solid representation can be formed for both solid and non-solid geometry through discretization.

In one embodiment, an occluder generation component receives a triangle soup as input. Note, a triangle soup is commonly used to refer to a group of unorganized triangles with no particular relationship. The triangle soup is a free-form input with no specific constraints placed on the input. The component generates a voxelized geometry representation of the input triangle soup. The component then generates a number of randomly-oriented candidate planes. The planes are independent of a view frustrum.

Further, each plane cuts through the voxelization. An intersection of a plane and the voxelization represents a solid occluder. That is, each planar intersection is a boundary slice of the voxelization. Therefore, using the planes allows the component to capture occlusion properties of the voxelized geometry. The component combines a subset of intersecting planes to generate an occluder representing a given geometry.

To identify the subset of planes used to generate an occluder, the component may calculate an occlusion measure. The occlusion measure indicates a strength of occlusion for a given object. Further, the occlusion measure generalizes the surface area to account for how effectively the object blocks rays with varying radii. The component then determines an optimal set of triangles in each plane to include in a resulting simplified occluder. The component identifies the planes having the largest occlusion measure and generates an occluder based on the union of the subset of the planes.

Advantageously, evaluating 2D slices of voxelized geometry allows the component to generate a simplified occluder for the input geometry without sacrificing error-boundedness properties. That is, the simplified occluder preserves occlusion characteristics using fewer triangles. Further, because of the relaxed requirements for an arbitrary input triangle soup (e.g., the input geometry does not need to be a closed two-manifold mesh as conventional techniques often require), the approach of using planar intersections may be extended to generate hierarchical occluders, where the component simplifies multiple objects together to generate a common occluder.

FIG. 1 illustrates an example of a geometric object and an occluder generated to represent a geometric object, according to one embodiment. In this example, the left panel A depicts a geometric object 105 that represents a rabbit.

Rendering processes may avoid rendering geometry unnecessary to the final image, such as parts of the image not visible by a camera. The rendering process may use occlusion culling to determine what objects do not need to be rendered because such objects are not visible.

In one embodiment, one such method includes generating an occluder representation of the object 105. As noted, an occluder is used in place of the object during occlusion culling. The right panel B depicts a simplified occluder 110. The simplified occluder 110 is a representation of the geometric object 105. Illustratively, the simplified occluder 110 consists of sixty-four triangles, which is 1.3% of the original amount of triangles that form the geometric object 105. Generally, a relatively low amount of triangles is desired in an occluder to preserve the benefits provided by using the occluder when performing occlusion culling techniques. At the same time, the occluder should also accurately represent the original object. That is, any ray that intersects the object should ideally intersect the occluder.

Figure 2:
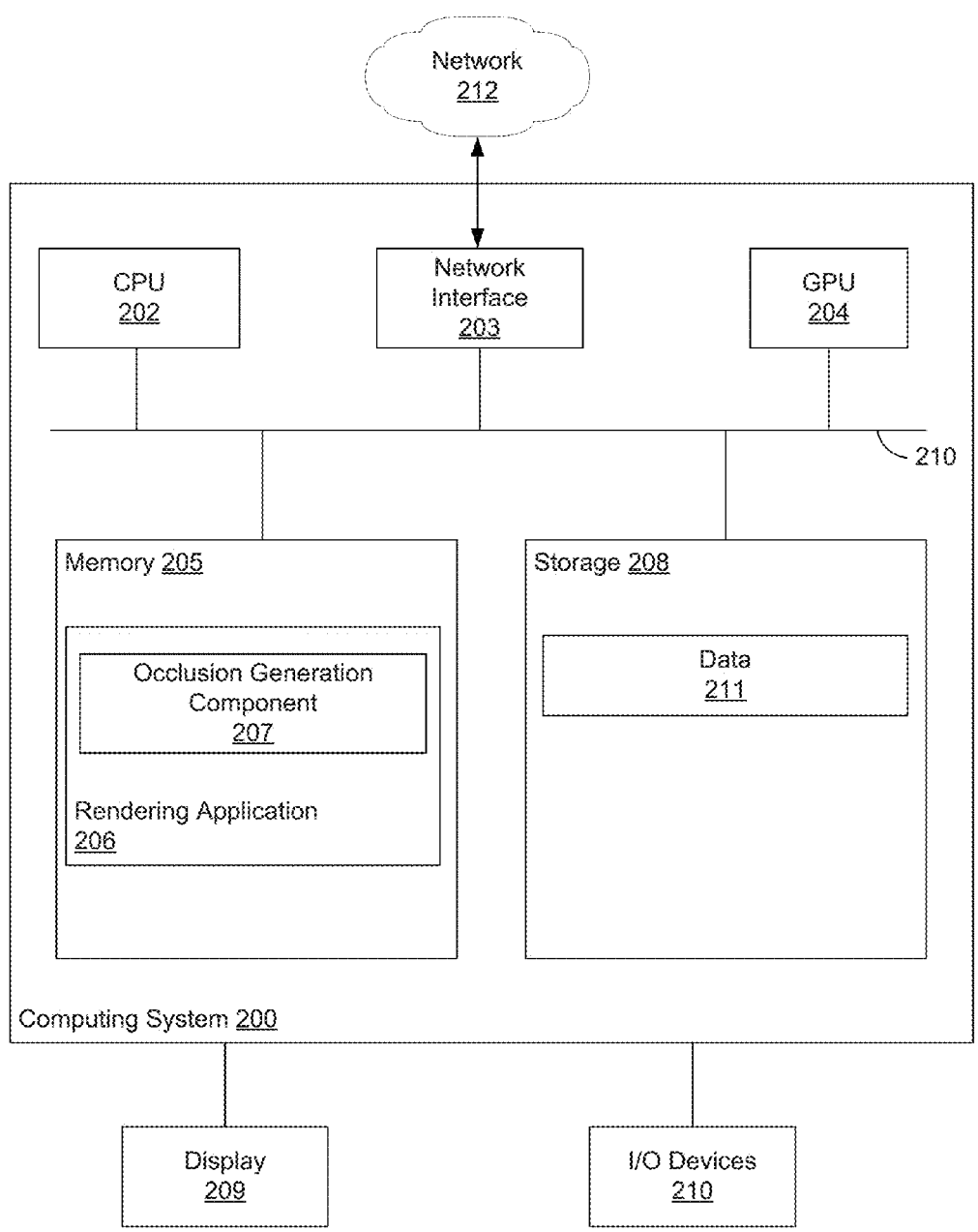
FIG. 2 illustrates a computing device configured to generate a simplified occluder, according to one embodiment.

FIG. 2 illustrates a computing system 200 configured to generate a simplified occluder, according to one embodiment. As shown, the computing system 200 includes a CPU (central processing unit) 202, a NIC (network interface card) 203, a GPU (graphical processing unit) 204, a memory 205, a storage 208, and a bus 210. The computing system 200 is connected to a network 212, and a display 209, and an input/output (I/O) device 210. The computing system 200 is included to be representative of a variety of computing systems, including, e.g., a desktop computer, a laptop computer, a tablet, a phone, a console game system, or variety of other computing devices capable of rendering graphics data.

The rendered graphics may be viewed on the display device 209, e.g., an LCD, LED or CRT monitor and controlled using input devices 210, e.g., a keyboard, mouse and/or a controller.

CPU 202 and GPU 204 are programmable logic devices that execute instructions, logic and mathematical processing, and may be representative of one or more CPUs multi-core CPUs, and/or GPUs, and the like. The memory 205 represents any memory sufficiently large to hold a rendering application 206 and the data structures associated with the cell and portal graph 206 while executing a given program. Memory 205 could be one or a combination of memory devices, including Random Access Memory (e.g., DRAM modules), nonvolatile or backup memory (e.g., programmable or Flash memories, read-only memories, etc.). Storage 208 stores application programs and graphics data 211 for use by the rendering application 206. Storage 208 is included to be representative of hard-disk drives, solid-state drives (SSD), flash memory devices, optical media (e.g., CD/DVD/Blu-Ray® discs) and the like.

In one embodiment, the rendering application 206 receives 3D geometry of a scene to render. Prior to rendering the scene, the application 206 may perform an occlusion culling process to identify portions of a geometry not visible by a camera, e.g., due to being obstructed by some other geometry. The occlusion culling process may include generating occluders for objects represented in the 3D geometry.

In one embodiment, the occluder generation component 207 may generate a simplified occluder to represent the 3D geometry of an object. In particular, the component 207 generates set of planar sections that cut through a voxelization of the 3D geometry. The occluder generation component 207 uses the planar sections to identify occlusion properties of the 3D geometry. That is, an intersection between a planar section and the voxelization represents a 2D interior slice of the geometry. Further, each 2D interior slice is a conservatively correct occluder, in that rays occluded by the slice are a subset of rays occluded by the geometry. The component 207 generates an occluder from a union of a subset of planes intersecting with the voxelization. As described below, the component 207 may identify an optimal subset of the planes to generate the occluder.

In one embodiment, the occlusion generation component 207 identifies the subset of planes using an occlusion measure. The occlusion measure indicates a strength of occlusion for the occluder. Further, the occlusion measure generalizes a surface area of the occluder to account for how effectively the occluder blocks beams of rays with varying radii. In addition, the occlusion measure is based on the assumption that the occluder that has an overall compact shape, relatively few holes, and a large local feature size has stronger occlusion properties than an occluder that does not.

In one embodiment, to calculate an occlusion measure of an object, the occluder generation component 207 determines occlusion caused by the object for a group of parallel rays of direction d. Assume $P_d: \mathbb{R}^3 \mapsto \mathbb{R}^2$ is the orthogonal projection operation in direction d. Further, assume also that $J_d = P_d O \subset \text{im}(P_d)$ is the orthogonal projection of an object O, i.e., a binary image that encodes the projected shape of the object as seen from direction d. The area of the projection $J_d$ corresponds directly to the number of parallel rays blocked by the object.

To extend to larger beams, assume that $B_r(x)$ is a 2D disk of radius r≥0 and center $x \in \text{im}(P_d)$. Thus, the disk directly corresponds to a cylinder of rays. That is, $P_d^{-1} B_r(x)$ is the set of 3D lines that project to the disk, and the object blocks the beam if and only if the disk $B_r(x)$ is fully contained in $J_d$. As a result, the number of blocked beams of radius r can be determined by the surface area of the set $J_{d,r}$ that remains after binary erosion of $J_d$ by $B_r$. The set $J_{d,r}$ can formally be expressed as $J_{d,r} = \{x \in B_r(x) \subset J_d\}$. The larger the area $A(J_{d,r})$, the more beams are blocked. Assuming a parallel projection, the surface area measures how many points the object can occlude in a given direction, while $A(J_{d,r})$ measures which beams with radius r the object has potential to occlude.

To measure the compound occlusion power over beams of all sizes, the occluder generation component 207 evaluates a directional occlusion measure M(d) as the integral of the area of the erosions over all beam radii. M(d) can be expressed as:

$$M(d) = \int_0^\infty A(J_{d,r}) dr \quad (1)$$

Note, the above integral never diverges because the area $A(J_{d,r})$ always decreases when the radius increases. To account for different directions, the occluder generation component 207 then determines a total occlusion measure M for the object O as the integral over all directions, which can be expressed as:

$$M = \int_\Omega M(d) d\omega \quad (2)$$

Further, the directional occlusion measure M(d) is closely connected to a Euclidean distance transform. The Euclidean distance transform D(x) at a point $x \in J_d$ gives the radius r of the maximal disk $B_r(x)$ such that $B_r(x) \subset J_d$. The directional occlusion measure M(d) can be expressed relative to the Euclidean distance transform D:

$$M(d) = \int_0^\infty A(J_{d,r}) dr = \int_{J_d} D(x) dA \quad (3)$$

where dA is the area measure on the projection plane. Equation 3 allows the occluder generation component 207 to efficiently evaluate the directional occlusion measure of an object by only computing M(d) once (instead of repeatedly evaluating $A(J_{d,r})$ for different radii). In practice, the occluder generation component 207 computes the directional occlusion measure by rasterizing the projection $J_d$ onto a discrete grid. The component 207 then computes the discrete Euclidean distance transform of the resulting binary image using a parallel jump flood fill algorithm and approximates the integral using a Riemann sum. In one embodiment, the component 207 can control the error introduced by the discrete pixel grid using rasterization resolution.

Once the subset of planes is identified based on the occlusion measure, the occluder generation component 207 generates the occluder based on the union of the planes. To do so, the occluder generation component 207 may generate a polygon simplification chain for each candidate polygon in the occluder. For each candidate polygon $P_i$ with $T_i$ triangles, the occluder generation component 207 builds a progressive simplification chain $(P_i^{T_i}, P_i^{T_i-1}, \ldots, P_i^1)$, where the superscripts denote the number of triangles via a greedy vertex collapse algorithm. The occluder generation component 207 iteratively collapses vertices from $P_i^{T_i}$ until identifying a polygon having a single triangle $P_i^1$. During each iteration, the occluder generation component 207 removes a vertex $v_k$ such that the area of the triangle $v_{k-1}, v_k, v_{k+i}$ is minimal and the resulting polygon is fully contained in the interior of the original candidate polygon. Thereafter, the occluder generation component 207 triangulates each resulting polygon $P_i^j$.

The occluder generation component 207 may then determine how many triangles of each candidate polygon to include in the resulting simplified occluder. To do so, the occluder generation component 207 identifies a cut across simplification chains $C = (c_1, c_2, \ldots, c_n)$, where $0 \leq c_i \leq T_i$, $i=1, \ldots, n$ such that the set of polygons $P = \{P_1^{c_1}, P_2^{c_2}, \ldots, P_n^{c_n}\}$ maximizes occlusion, subject to $\Sigma_{i=r}^n c_i \leq B$. The occluder generation component 207 starts with cut $C_0 = (0, 0, \ldots, 0)$ and continues by adding one polygon $P_i^{T_i}$ iteratively until the cut is α-complete (i.e., adding new polygons would increase the occlusion measure by less than α percent). During each step K, the occluder generation component 207 evaluates all possible cuts $C_{k+1}$ by adding a new polygon $P_i^{T_i}$. Further, the component 207 selects the cut from the set that maximizes the total occlusion measure for the polygon soup corresponding to that cut.

The occluder generation component 207 continues to simplify the cut until the triangle budget is satisfied. For instance, using the cut identified in the greedy algorithm, the component 207 can remove one triangle at a time until the budget is satisfied. During each step k, the component 207 evaluates all possible cuts $C_{k+1}$ obtained by traversing a single step in the simplification chain of every polygon. The component 207 identifies the cut that maximizes the surface area of $C_{k+1}$.

Figure 3:
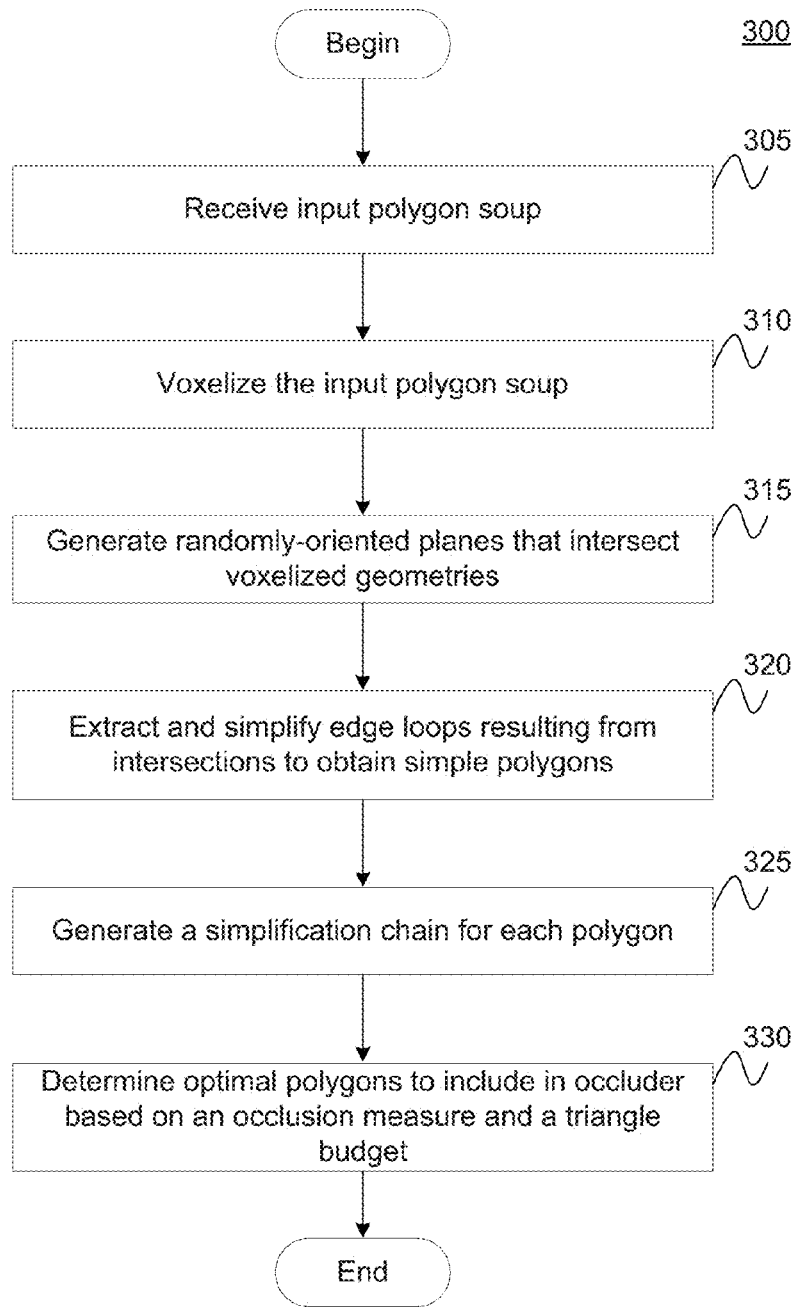
FIG. 3 illustrates a method for generating a simplified occluder, according to one embodiment.

FIG. 3 illustrates a method 300 for generating a simplified occluder, according to one embodiment. Method 300 begins at step 305, where the occluder generation component 207 receives triangle set of input geometry for one or more objects. As noted, the input triangles may be supplied as an arbitrary triangle soup. The triangle soup is a free-form input with no specific constraints placed on the input.

At step 310, the occluder generation component 207 voxelizes the triangle soup. The occluder generation component 207 may use a voxel resolution that is suitable for an allowed Euclidean error for a resulting simplified occluder. Initially, the occluder generation component 207 labels all voxels as OUTSIDE. The occluder generation component 207 then, for each input triangle, marks all voxels touched by that triangle as INSIDE. The occluder generation component 207 may do so by performing an axis-aligned bounding box (AABB) test against the input triangle.

After processing the input triangles, the occluder generation component 207 may partition the remaining OUTSIDE voxels into 6-connected components using a flood fill technique. The occluder generation component 207 then marks voxels in the components that do not connect to the boundary of the voxel grid as INSIDE. Doing so results in closed boundaries becoming solid objects.

Further, the occluder generation component 207 generates a voxel mesh by iterating over each voxel and adding two triangles for each face between an INSIDE and an OUTSIDE voxel, orienting the triangles consistently towards that OUTSIDE voxel. Doing so results in a closed, 2-manifold triangle mesh.

At step 315, the occluder generation component 207 generates planar sections to slice through the voxelized geometry. To do so, the occluder generation component 207 discretizes the search space by dividing sample directions and depths into bins. The occluder generation component 207 generates a single representative 2D slice for each bin by sampling the corresponding direction and depth ranges. The occluder generation component 207 selects the slice with the maximal surface area.

The occluder generation component 207 uses the planar sections to sample the depth interval of an object AABB, given a direction d. For each slice, the occluder generation component 207 rasterizes the voxel mesh using an orthogonal projection, where the near clip plane is set at the slicing depth, and where the far clip plane is behind the voxel mesh. The occluder generation component 207 sets a stencil buffer to increment by one (for back faces) and decrement by one (for front faces) of the near-clipped mesh. As a result, the occluder generation component 207 obtains a bitmap image of the slice in the stencil buffer. The component 207 selects a rasterization resolution based on the voxel resolution so that each voxel in the discretized input covers at least one pixel.

At step 320, the occluder generation component 207 extracts and simplifies edge loops resulting from the slices (i.e., the intersections between the planes and voxelization). Such techniques are described in further detail relative to FIGS. 5 and 6. The occluder generation component 207 does so to obtain candidate polygons for generating a simplified occluder.

At step 325, the occluder generation component 207 generates a simplification chain for each polygon. As stated, the component 207 can generate a progressive simplification chain, which the component 207 traverses iteratively to simplify the number of triangles in each polygon. Further, the occluder generation component 207 triangulates each resulting polygon.

At step 330, the occluder generation component 207 determines an optimal subset of candidate polygons to use in the resulting occluder based on a budget of k triangles and an occlusion measure for a resulting simplified occluder. The triangle budget matches an amount of triangles in the resulting simplified occluder. As stated, the occlusion measure indicates an strength of occlusion for a given object. As also stated, each planar section consists of a set of polygons. Further, each of the polygons are not necessarily connected to one another. Thus, to identify a subset of triangles that will form the optimized occluder, the occluder generation component 207 builds a polygon simplification chain for each polygon.

The polygon simplification chain allows the occluder generation component 207 to identify polygons that maximize the occlusion measure respective to the triangle budget. For example, assume the triangle budget is sixteen triangles. If the occluder is over the budget, then the occluder generation component 207 evaluates a simplification chain of the polygons to reduce the amount of triangles to eventually arrive at the budgeted amount. Once determined, the occluder generation component 207 generates the occluder by evaluating the union of the subset of candidate planes.

Figures 4A, 4B:
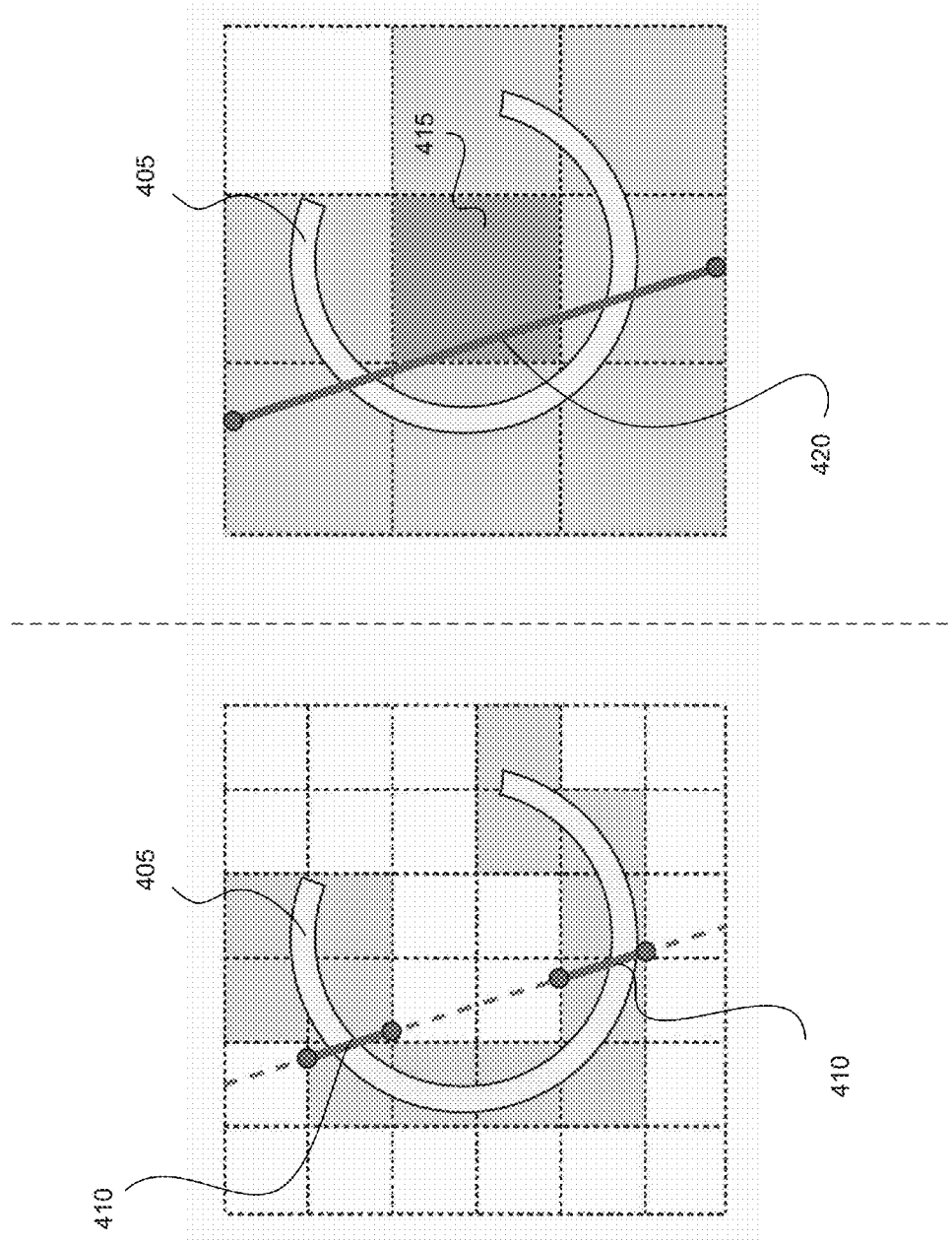
FIG. 4 illustrates an example of a resolution-dependent discretization and a resulting interpretation of an input geometry, according to one embodiment.

FIGS. 4A and 4B illustrate an example of a resolution-dependent discretization and a resulting interpretation of an input geometry 405 after voxelizing the input geometry, according to one embodiment. A discretization resolution determines a natural feature size, such that the occluder generation component 207 automatically fills smaller holes in the occluder. Doing so allows simplified occluders generated by the component 207 to remain error-bounded.

FIG. 4A illustrates a scale-sensitive discretization in fine scale (i.e., corresponding to using the occluder near a camera). In this example, the input geometry 405 is open. That is, the input geometry 405 allows visibility between an interior and exterior. Illustratively, a candidate plane 410 cutting through the input geometry 405 for the simplified occluder contains only the boundary of the object.

FIG. 4B illustrates the scale-sensitive discretization on a coarser scale. Such a scale is applicable for using the occluder from a farther distance. A flood fill marks the interior voxel 415 as INSIDE. Doing so allows the occluder generation component 207 to generate an occluder candidate slice that spans the entire object.

Figure 5:
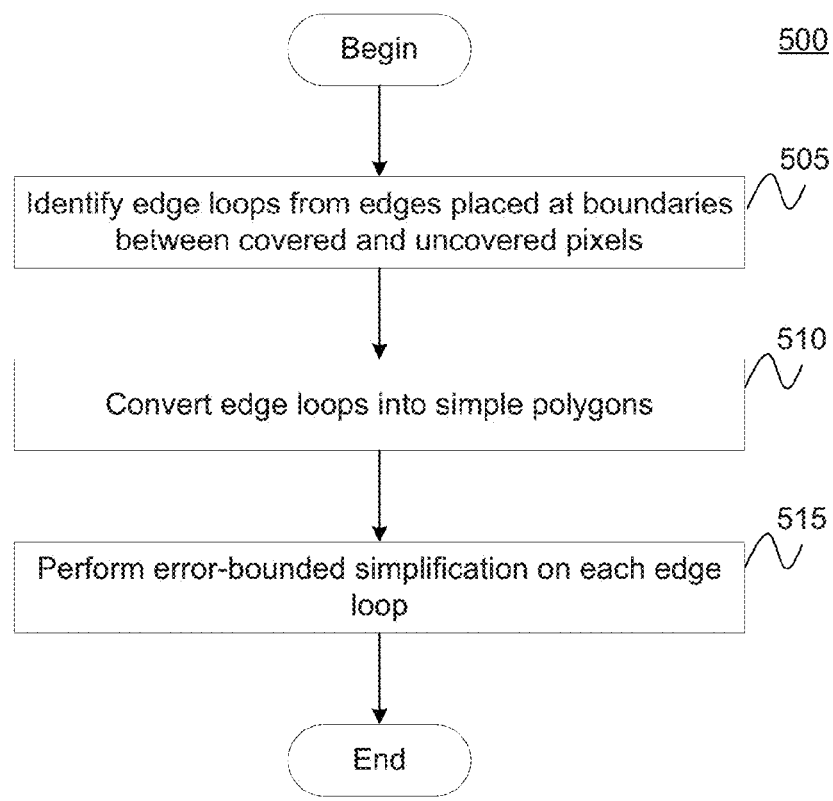
FIG. 5 illustrates an example of occluder candidate generation, according to one embodiment.

FIG. 5 illustrates a method 500 for extracting and simplifying edge loops in a 2D slice, according to one embodiment. As stated, the occluder generation component 207 generates planar sections that cut through the voxelization geometry. Each resulting planar intersection yields a bitmap representing a slice of the voxelization. Method 500 begins at step 505, where the occluder generation component 207 identifies edge loops in the slice bitmap. The occluder generation component 207 extracts the edge loops from edges placed at boundaries between covered and uncovered pixels.

At step 510, the occluder generation component 207 converts the edge loops into simple polygons. To do so, the component 207 connects each edge loop that represents a hole in the slice to an enclosing boundary loop. As a result, the edge loop becomes a part of the boundary. The resulting polygons may contain redundant edges.

At step 515, the occluder generation component 207 performs error-bounded simplification techniques on each edge loop to remove redundant edges. In one embodiment, the occluder generation component 207 uses a Ramer-Douglas-Peucker algorithm, which takes a maximum allowed deviation of the simplified edge loop as input and sets the deviation to match a specified voxel resolution.

Figure 6:
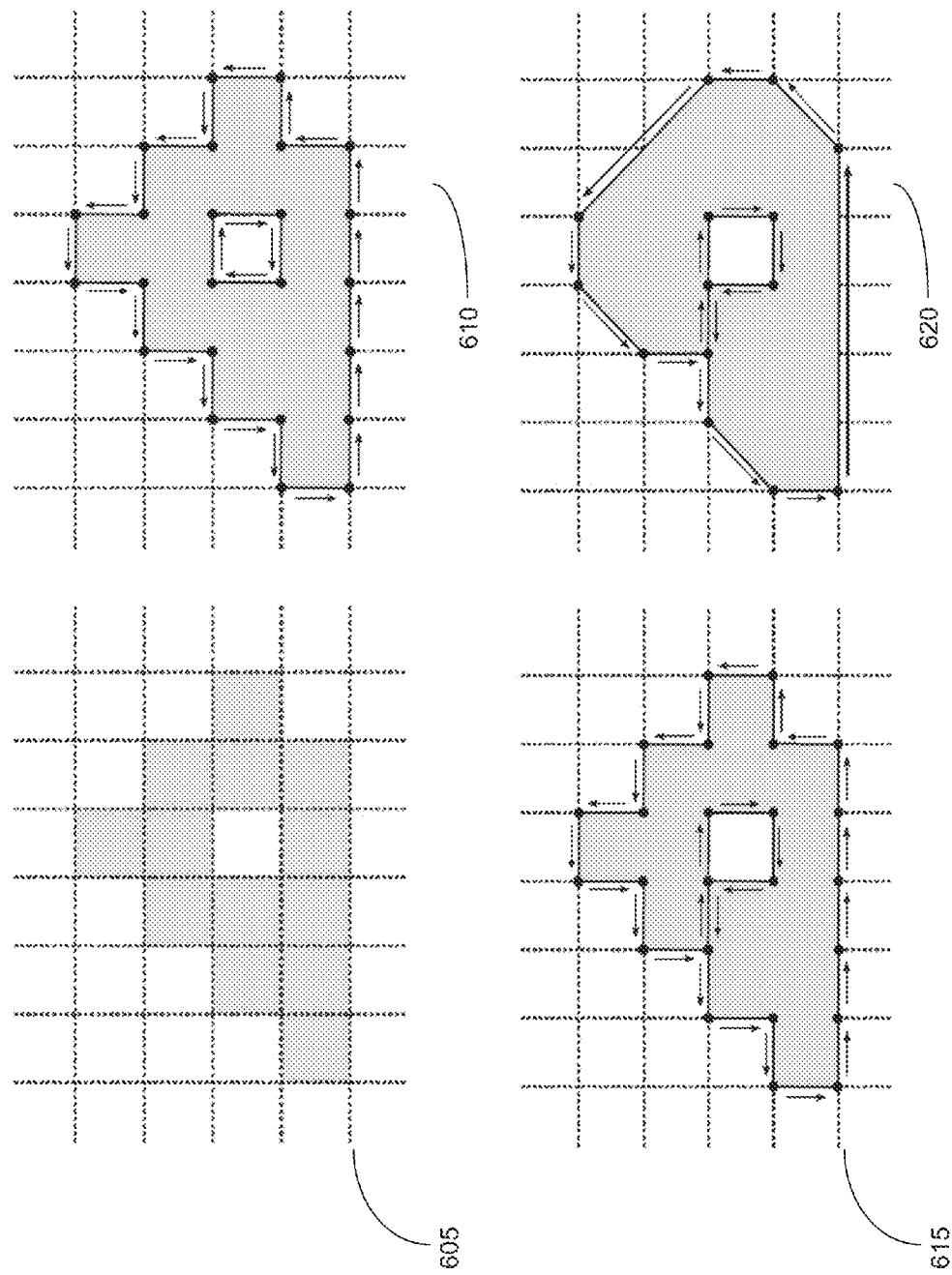
FIG. 6 illustrates a method for extracting and simplifying edge loops in a 2D slice, according to one embodiment.

FIG. 6 illustrates occluder candidate generation on an example slice bitmap using the method 500, according to one embodiment. Box 605 illustrates a rasterized depth slice. The slice is a bitmap of a rasterized voxel mesh.

Box 610 illustrates the depth slice after the occluder generation component 207 has identified edge loops in the slice (at step 505). As stated, the occluder generation component 207 extracts edge loops by connecting boundary edges of the rasterized pixels.

Box 615 illustrates a resulting polygon after the occluder generation component 207 has connected each edge loop that represents a hole in the slice to the enclosing boundary loop to simplify the topology (at step 510). Box 620 illustrates a simplified polygon after the occluder generation component 207 has performed error-bound simplification techniques using a specified tolerance (at step 620).

Figure 7:
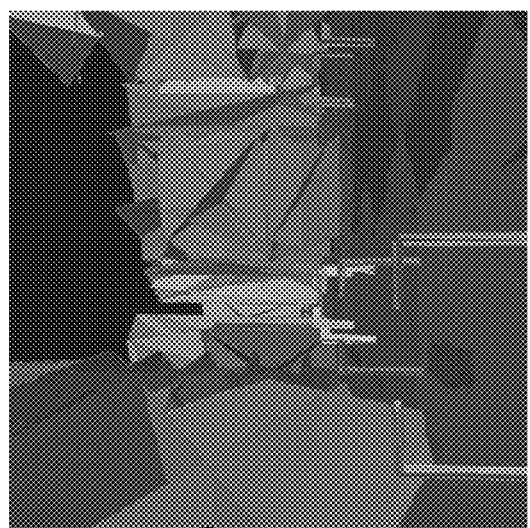
FIG. 7 illustrates an example of hierarchical occluders generated for a scene, according to one embodiment.
Figure 7:
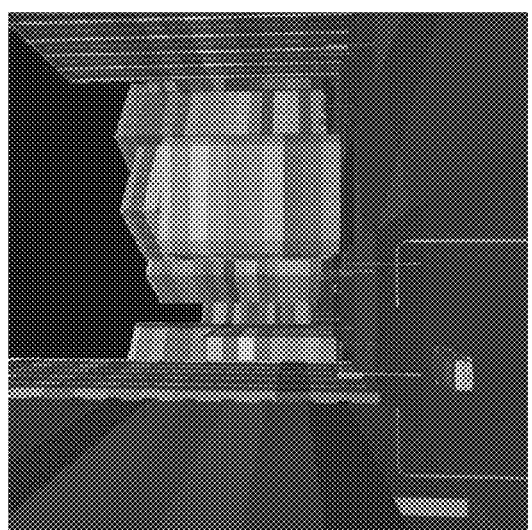

FIG. 7 illustrates an example of hierarchical occluders generated for a scene, according to one embodiment. In one embodiment, the occluder generation component 207 can apply the techniques described above to generate occluders in complex settings, such as a cityscape portrayed in original scene 705.

In one embodiment, the occluder generation component 207 generates a bounding volume hierarchy (BVH) and generates a simplified occluder for each node. To allow for smooth transitions between differing levels of hierarchy, the occluder generation component 207 applies a dilation step during voxelization, where the component 207 marks every OUTSIDE voxel as INSIDE if that voxel has immediately neighboring voxels marked as INSIDE. Doing so results in the neighboring voxels being "glued" together.

At runtime, the rendering application 206 selects a suitable set of occluder nodes based on a camera position and viewing parameters. For instance, scene 710 presents an example of such occluders. The rendering application 206 uses the occluders in occlusion culling methods relative to the camera position using an AABB for each object as a testing primitive. The rendering application 206 expands the testing primitives based on screen space error bounds.

The following discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for simplifying an occluder representing 3D graphics data, the method comprising:
    voxelizing the graphics data corresponding to one or more 3D objects;
    generating a plurality of planes to intersect the voxelized graphics data;
    evaluating intersections between the planes and the voxelized graphics data to identify corresponding slice polygons from the intersections, wherein evaluating the intersections comprises, for each intersecting plane:
        extracting edge loops from a bitmap image representation of an interior of the 3D object in the intersecting plane, and
        converting each edge loop into the corresponding slice polygons;
    selecting a subset of the planes to maximize a correctness of a simplified occluder; and
    generating the simplified occluder representing each 3D object from a union of the selected subset of the planes.

2. The method of claim 1, wherein the maximized correctness based on an occlusion measure and a maximum count of triangles.

3. The method of claim 2, wherein the occlusion measure of each 3D object is generated by:
    rasterizing the 3D object as a binary image using parallel projection;
    computing a Euclidean distance transform of the binary image; and
    approximating the occlusion measure as a Riemann sum.

4. The method of claim 2, wherein selecting the subset of the planes to maximize a correctness of the simplified occluder comprises:
    generating a polygon simplification chain for each corresponding slice polygon; and
    determining a subset of polygon simplification chains that results in maximum occlusion based on the occlusion measure and the maximum count of triangles.

5. The method of claim 4, wherein identifying the subset of the planes based on the occlusion measure and the maximum count of triangles of triangles further comprises:

upon determining that a count of triangles present in the subset exceeds the budget, iteratively removing triangles from the subset of the planes until the budget of triangles is satisfied.

6. The method of claim 1, wherein the simplified occluder is generated as a node in a bounding volume hierarchy.

7. A non-transitory computer-readable storage medium storing instructions, which, when executed on a processor, perform an operation for simplifying an occluder representing 3D graphics data, the method comprising:

voxelizing the graphics data corresponding to one or more 3D objects;

generating a plurality of planes to intersect the voxelized graphics data;

evaluating intersections between the planes and the voxelized graphics data to identify corresponding slice polygons from the intersections, wherein evaluating the intersections comprises, for each intersecting plane:

extracting edge loops from a bitmap image representation of an interior of the 3D object in the intersecting plane, and converting each edge loop into the corresponding slice polygons;

selecting a subset of the planes to maximize a correctness of a simplified occluder; and generating the simplified occluder representing each 3D object from a union of the selected subset of the planes.

8. The computer-readable storage medium of claim 7, wherein the maximized correctness based on an occlusion measure and a maximum count of triangles.

9. The computer-readable storage medium of claim 8, wherein the occlusion measure of each 3D object is generated by:

rasterizing the 3D object as a binary image using parallel projection;

computing a Euclidean distance transform of the binary image; and approximating the occlusion measure as a Riemann sum.

10. The computer-readable storage medium of claim 8, wherein selecting the subset of the planes to maximize a correctness of the simplified occluder comprises:

generating a polygon simplification chain for each corresponding slice polygon; and determining a subset of polygon simplification chains that results in maximum occlusion based on the occlusion measure and the maximum count of triangles.

11. The computer-readable storage medium of claim 10, wherein identifying the subset of the planes based on the occlusion measure and the maximum count of triangles of triangles further comprises:

upon determining that a count of triangles present in the subset exceeds the budget, iteratively removing triangles from the subset of the planes until the budget of triangles is satisfied.

12. The computer-readable storage medium of claim 7, wherein the simplified occluder is generated as a node in a bounding volume hierarchy.

13. A system, comprising:

a processor; and a memory hosting a program, which, when executed on the processor, performs an operation for simplifying an occluder representing 3D graphics data, the operation comprising:

voxelizing the graphics data corresponding to one or more 3D objects;

generating a plurality of planes to intersect the voxelized graphics data;

evaluating intersections between the planes and the voxelized graphics data to identify corresponding slice polygons from the intersections, wherein evaluating the intersections comprises, for each intersecting plane:

extracting edge loops from a bitmap image representation of an interior of the 3D object in the intersecting plane, and converting each edge loop into the corresponding slice polygons;

selecting a subset of the planes to maximize a correctness of a simplified occluder; and generating the simplified occluder representing each 3D object from a union of the selected subset of the planes.

14. The system of claim 13, wherein the maximized correctness based on an occlusion measure and a maximum count of triangles.

15. The system of claim 14, wherein selecting the subset of the planes to maximize a correctness of the simplified occluder comprises:

generating a polygon simplification chain for each corresponding slice polygon; and determining a subset of polygon simplification chains that results in maximum occlusion based on the occlusion measure and the maximum count of triangles.

16. The system of claim 15, wherein identifying the subset of the planes based on the occlusion measure and the maximum count of triangles of triangles further comprises:

upon determining that a count of triangles present in the subset exceeds the budget, iteratively removing triangles from the subset of the planes until the budget of triangles is satisfied.

17. The system of claim 13, wherein the simplified occluder is generated as a node in a bounding volume hierarchy.

* * * * *